(12) United States Patent
Huang

(10) Patent No.: US 7,638,907 B2
(45) Date of Patent: Dec. 29, 2009

(54) STEP MOTOR FOR A DRIVING MECHANISM OF CAMERA

(75) Inventor: Tien-Chung Huang, Changhua County (TW)

(73) Assignee: Tricore Corporation, Chang Hua (TW)

( * ) Notice: Subject to any disclaimer, the term of this patent is extended or adjusted under 35 U.S.C. 154(b) by 242 days.

(21) Appl. No.: 11/653,993

(22) Filed: Jan. 17, 2007

(65) Prior Publication Data

US 2007/0164640 A1 Jul. 19, 2007

(30) Foreign Application Priority Data

Jan. 17, 2006 (TW) .................................. 95201051

(51) Int. Cl.
*H02K 37/00* (2006.01)
(52) U.S. Cl. ..................... 310/49 R; 310/216; 310/254; 310/261
(58) Field of Classification Search ............... 310/49 R, 310/179, 216, 254, 261; 335/272; 369/463
See application file for complete search history.

(56) References Cited

U.S. PATENT DOCUMENTS

| | | | |
|---|---|---|---|
| 7,338,221 B2* | 3/2008 | Oishi et al. | 396/458 |
| 2006/0152093 A1* | 7/2006 | Oishi et al. | 310/36 |
| 2006/0186742 A1* | 8/2006 | Miyawaki | 310/49 R |
| 2007/0018513 A1* | 1/2007 | Yamamoto et al. | 310/49 R |

* cited by examiner

*Primary Examiner*—Thanh Lam
(74) *Attorney, Agent, or Firm*—Bacon & Thomas, PLLC

(57) ABSTRACT

A step motor mounted inside a camera for moving a driven member is disclosed to include a yoke iron, which has a base, two arms respectively extended from two sides of the base, and four magnetic poles respectively formed on the free ends of the arms and each junction between the base and the arms, two windings respectively surrounding the two arms of the yoke iron, a magnet, which is rotatably floating among the magnetic poles of the yoke iron by a magnetic force has sectors of different magnetic poles abutted against one another, and a crank, which is coupled to and rotatable with the magnet and has an actuating axle connected to the driven member of the camera for moving the driven member upon rotation of the magnet.

6 Claims, 2 Drawing Sheets

STEP MOTOR FOR A DRIVING MECHANISM OF CAMERA

BACKGROUND OF THE INVENTION

1. Field of the Invention

The present invention relates to a step motor and more particularly, to a step motor of a driving mechanism for use in a camera.

2. Description of the Related Art

Conventionally, the step motor of a driving mechanism for use in a camera generally comprises a magnet and a plurality of yoke irons. Each yoke has a winding. By means of the respective windings to change the magnetic fields of the yoke irons, the magnet and the yoke irons are induced, thereby causing a motion.

However, because the aforesaid prior art step motor uses multiple yoke irons to form multiple magnetic fields, it is difficult to control the installation precision of the yoke irons and the accuracy of the action of the step motor. Further, the use of the multiple yoke irons complicates the structure of the step motor, resulting in a high manufacturing cost.

Therefore, it is desirable to provide a step motor that eliminates the aforesaid drawbacks.

SUMMARY OF THE INVENTION

The present invention has been accomplished under the circumstances in view. It is therefore the main object of the present invention to provide a step motor for camera, which provides a high precision, achieving an accurate action. It is another object of the present invention to provide a step motor for camera, which is easy to assemble and inexpensive to manufacture.

To achieve these and other objects of the present invention, the step motor is mounted inside a camera and adapted to move a driven member of the camera, comprising a yoke iron, two windings, a magnet, and a crank. The yoke iron comprises a base, two arms respectively extended from the base at two sides and terminating in a respective free end, and four magnetic poles respectively formed on the free ends of the arms and each junction between the base and the arms. The two windings respectively surround the two arms of the yoke iron. The magnet is rotatably floating among the magnetic poles of the yoke iron by a magnetic force, comprising a cylindrical iron core, which is divided into a plurality of sectors abutted against one another. The sectors have two different magnetic poles alternatively arranged together. The crank is coupled to and rotatable with the magnet, having an actuating axle connected to the driven member of the camera for moving the driven member of the camera upon rotation of the magnet.

DETAILED DESCRIPTION OF THE INVENTION

Figure 1:
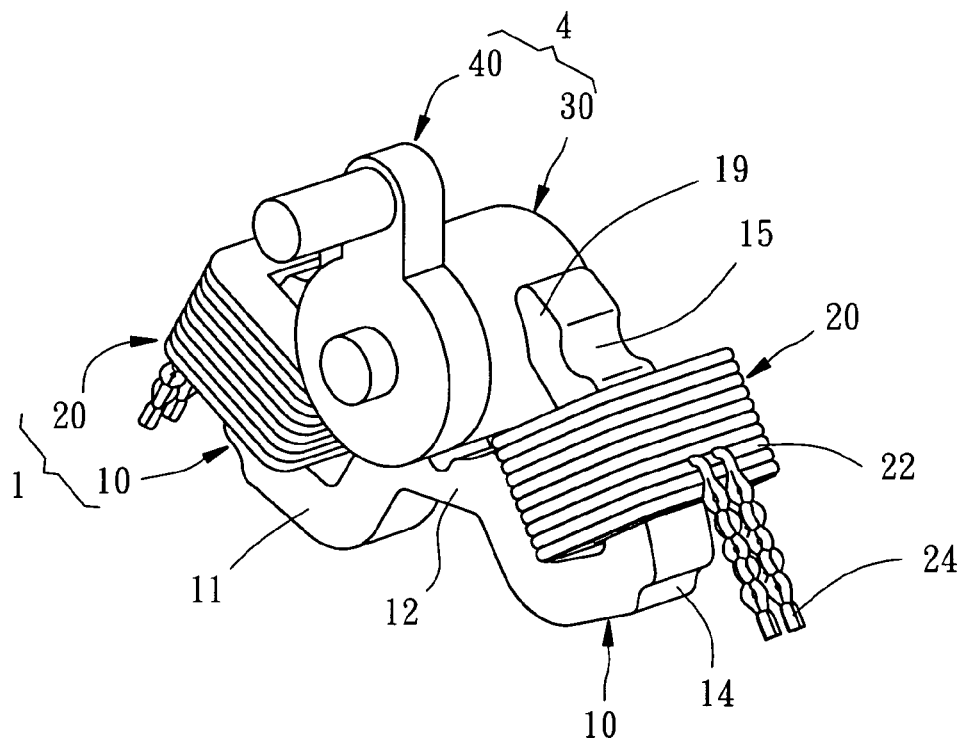
FIG. 1 is an elevational assembly view of a step motor in accordance with the preferred embodiment of the present invention.
Figure 2:
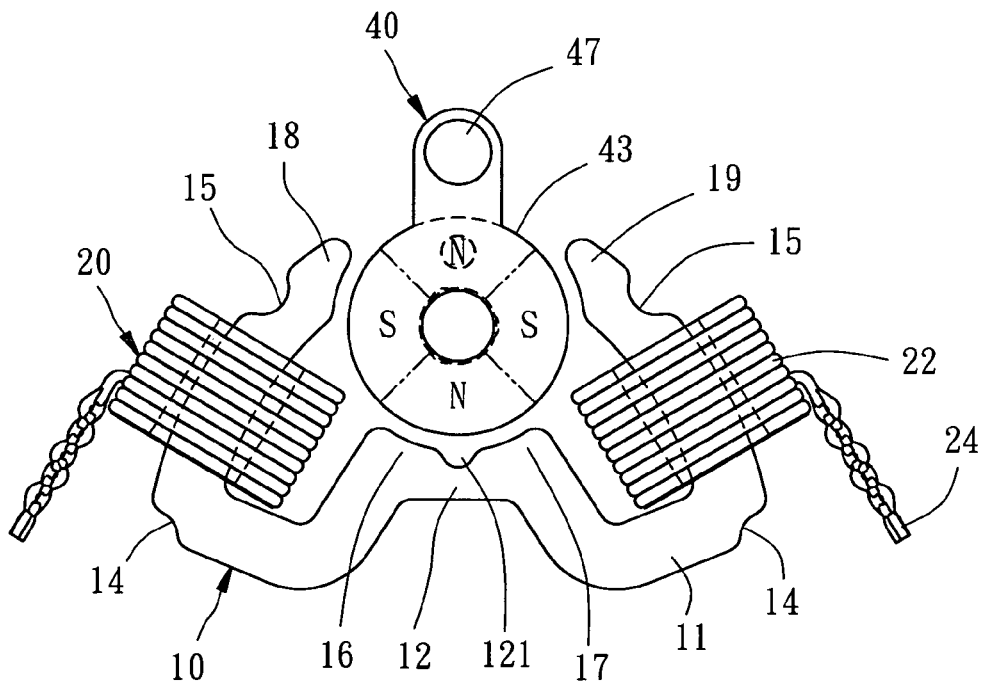
FIG. 2 is a front view of the step motor according to the preferred embodiment of the present invention.
Figure 3:
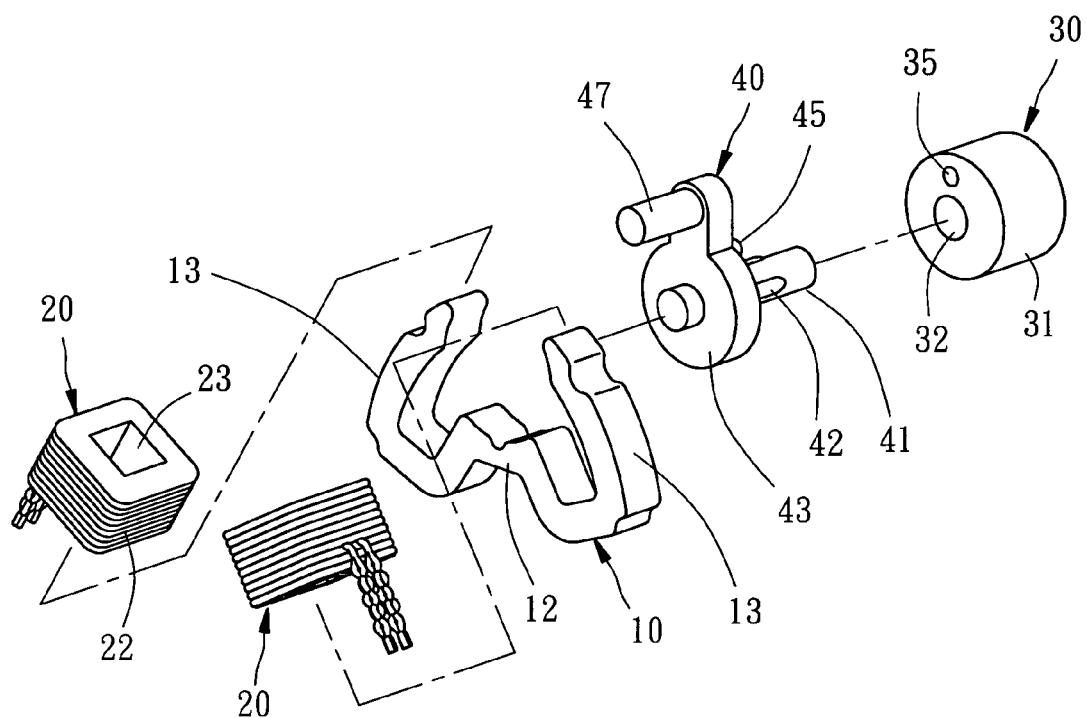
FIG. 3 is an exploded view of the step motor according to the preferred embodiment of the present invention.
Figure 4:
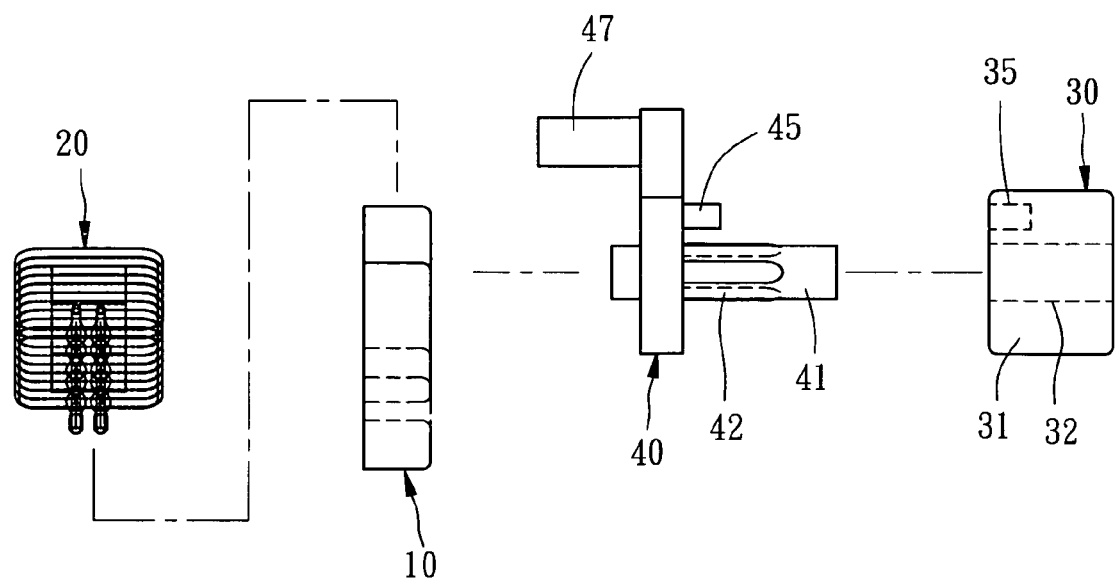
FIG. 4 is an exploded side view of the step motor according to the preferred embodiment of the present invention.

Referring to FIGS. 1~4, a step motor in accordance with the present invention is designed for use in a camera to control the action of the shutter (or aperture). The step motor is comprised of a winding assembly 1 and a crank assembly 4. The winding assembly 1 is formed of a yoke iron 10 and two windings 20. The crank assembly 4 is formed of a magnet 30 and a crank 40.

The yoke iron 10 comprises an iron body 11 having a substantially W-shaped profile. The iron body 11 has an invertedly disposed U-shaped base 12, and two arms 13 respectively extended from the two distal ends of the U-shaped base 12 and arranged in parallel to the two opposite lateral sides of the U-shaped base 12. The two arms 13 each have a lower locating groove 14 and an upper locating groove 15 transversely arranged at an outer side at different elevations. Further, the U-shaped base 12 has a recessed portion 121, and two magnetic poles 16 and 17 respectively provided between the recessed portions 121 and the arms 13. The arms 13 each have the respective free end respectively terminating in a respective magnetic pole 18 or 19.

The two windings 20 are respectively formed of a respective enameled wire 22, each defining an axially extending center coupling hole 23. By means of the respective center coupling holes 23, the windings 20 are respectively mounted on the arms 13 of the yoke iron 10. Further, the two distal ends of each of the two enameled wires 22 of the windings 20 are respectively out of the respective windings 20, forming respective lead-out ends 24.

The magnet 30 comprises a cylindrical iron core 31 that is divided into four equal sectors in alternative poles, i.e., S-pole and N-pole. The cylindrical iron core 31 has an axially extending center axle hole 32 and a locating hole 35 on one end. By means of the magnetic force of the cylindrical iron core 31, the magnet 30 is floating among the magnetic poles 16, 17, 18 and 19 of the yoke iron 10.

The crank 40 comprises a flat plate 43, a shaft 41 perpendicularly extended from one side of the flat plate 43 and inserted into the center axle hole 32 of the cylindrical iron core 31 of the magnet 30, a plurality of locating ribs 42 protruded from the periphery of the shaft 41 and engaged into the center axle hole 32 of the cylindrical iron core 31 of the magnet 30 to secure the shaft 41 to the magnet 30, a positioning rod 45 perpendicularly extended the same side of the flat plate 43 and engaged into the locating hole 35 of the cylindrical iron core 31 of the magnet 30 to prohibit rotation of the magnet 30 relative to the shaft 41, and an actuating axle 47 perpendicularly extended from the other side of the flat plate 43 at an eccentric location relative to the shaft 41.

The operation of the present invention is outlined hereinafter with reference to FIGS. 1 and 2 again. The winding assembly 1 surrounds the crank assembly 4. By means of the magnetic force of the magnetic poles 16~19, the winding assembly 1 keeps the magnet 30 of the crank assembly 4 is balance. Further, the winding assembly 1 and the crank assembly 4 do not touch each other. The magnet 30 of the crank assembly 4 is rotatable on its own axis.

When electricity is transmitting through the lead-out ends 24 of the windings 20, the windings 20 induces an electric potential to change the polarity of the magnetic poles 16~19 of the yoke iron 10. Due to the change of the magnetic fields around the magnet 30 of the crank assembly 4, the magnet 30 is caused to rotate on the axis of the crank assembly 4, and therefore the actuating axle 47 is moved.

In the aforesaid embodiment, the magnetic poles 16~19 are formed integral with the yoke iron 10. Therefore, the relative positioning of the magnetic poles 16~19 is accurate and the magnetic poles 16~19 have uniform material properties, assuring accurate rotation of the magnet 30 for accurate transmission of motion through the actuating axle 47 of the crank 40.

As indicated above, the present invention has the following benefits:

1. The yoke iron of the step motor is made in integrity, therefore the precision and accuracy of the magnetic fields of the multiple magnetic poles of the yoke iron are superior to conventional designs, achieving an accurate action.

2. The step motor is formed of a number of parts less than conventional designs. The simple structure design of the step motor is easy to assemble, saving much fabrication time and labor. Therefore, the invention saves much the manufacturing cost of the step motor.

What is claimed is:

1. A step motor mounted inside a camera and adapted to move a driven member of said camera, the step motor comprising:

a yoke iron, said yoke iron comprising a base, two arms respectively extended from said base at two sides and terminating in a respective free end, and four magnetic poles respectively formed on the free ends of said arms and each junction between said base and said arms, said base of the yoke iron having a recessed portion formed at a side of the base thereof facing said two magnetic poles of the free ends of said arms for separating said two magnetic poles on the junctions between said base and said arms;

two windings respectively surrounding said two arms of the yoke iron;

a magnet rotatably floating among said magnetic poles of the yoke iron by a magnetic force, said magnet comprising a cylindrical iron core divided into a plurality of sectors abutted against one another, said sectors having two different magnetic poles alternatively arranged together; and a crank coupled to and rotatable with said magnet, said crank having an actuating axle connected to said driven member of the camera for moving said driven member of the camera upon rotation of said magnet.

2. The step motor as claimed in claim 1, wherein said yoke iron has a plurality of outer locating grooves for positioning in said camera.

3. The step motor as claimed in claim 1, wherein said windings each have a center coupling hole respectively coupled to said arms of the yoke iron.

4. The step motor as claimed in claim 1, wherein said crank has a shaft affixed to said magnet.

5. The step motor as claimed in claim 1, wherein said cylindrical iron core of said magnet has a locating hole said crank has a positioning member fastened to said locating hole of said cylindrical iron core of the magnet for allowing rotation of said crank with said magnet.

6. The step motor as claimed in claim 1, wherein each of said arms of the yoke iron forms a shape of a constant radius arc and permits said coils to sleeve thereon from the free ends of said arms respectively.

\* \* \* \* \*